United States Patent
Parkinson

(10) Patent No.: US 8,970,702 B2
(45) Date of Patent: Mar. 3, 2015

(54) CONTROLLING ACCESS TO A CONTROL PANEL COMPARTMENT

(75) Inventor: Aaron Parkinson, Boca Raton, FL (US)

(73) Assignee: Multitrode Pty Ltd, Eight Mile Plains, QLD (AU)

( * ) Notice: Subject to any disclaimer, the term of this patent is extended or adjusted under 35 U.S.C. 154(b) by 579 days.

(21) Appl. No.: 13/242,765

(22) Filed: Sep. 23, 2011

(65) Prior Publication Data
US 2012/0075474 A1 Mar. 29, 2012

Related U.S. Application Data

(60) Provisional application No. 61/386,965, filed on Sep. 27, 2010.

(51) Int. Cl.
| | |
|---|---|
| *H04N 7/18* | (2006.01) |
| *G07C 9/00* | (2006.01) |
| *G06Q 10/06* | (2012.01) |

(52) U.S. Cl.
CPC ............ *G07C 9/00571* (2013.01); *G06Q 10/06* (2013.01); *G07C 9/00079* (2013.01); *G07C 9/00563* (2013.01)
USPC ....................................................... 348/156

(58) Field of Classification Search
CPC . G06K 9/00261; G06K 9/00295; G07C 9/00; H04N 1/00151; H04N 1/4406
USPC .......................................................... 348/156
See application file for complete search history.

(56) References Cited

U.S. PATENT DOCUMENTS

| | | | |
|---|---|---|---|
| 5,434,399 A | 7/1995 | Barbe | |
| 5,475,378 A | 12/1995 | Kaarsoo et al. | |
| 5,924,846 A * | 7/1999 | Arnold et al. | ................... 417/36 |
| 6,570,610 B1 * | 5/2003 | Kipust | .......................... 348/156 |
| 7,340,311 B2 | 3/2008 | Landis et al. | |
| 2009/0040014 A1 * | 2/2009 | Knopf et al. | ................... 340/5.1 |
| 2010/0321180 A1 * | 12/2010 | Dempsey et al. | ......... 340/539.12 |
| 2011/0091080 A1 * | 4/2011 | Gamliel et al. | ............... 382/118 |

FOREIGN PATENT DOCUMENTS

WO   WO 2008029159 A1 *   3/2008

* cited by examiner

*Primary Examiner* — Sath V Perungavoor
*Assistant Examiner* — Jeffery Williams
(74) *Attorney, Agent, or Firm* — Hunter Clark PLLC

(57) ABSTRACT

The present invention relates to a method for controlling access to a compartment of a control panel. The method includes the step of posing, with a controller, an indemnification query to a user. The controller receives a response to the indemnification query. The method further includes the step of enabling, with the controller, access to the compartment subsequent to receiving said response.

20 Claims, 9 Drawing Sheets

CONTROLLING ACCESS TO A CONTROL PANEL COMPARTMENT

CROSS-REFERENCE TO RELATED ACTIONS

This application claims priority to of U.S. Provisional Application No. 61/386,965 filed on Sep. 27, 2010.

TECHNICAL FIELD

The present invention generally relates to controlling access to a compartment of a control panel. The present invention has particular, although not exclusive application to pumping station control panels.

BACKGROUND

The reference to any prior art in this specification is not, and should not be taken as an acknowledgement or any form of suggestion that the prior art forms part of the common general knowledge.

Pumping stations 2 for emptying sewage wells (FIG. 1) are known. These pumping stations 2 typically include a well 4 in which liquid 6 is located, a level sensor 8 for sensing the liquid level in the well 4, a pair of pumps 10a, 10b for pumping liquid out of the well 4 as required, and a control panel 11 (FIG. 2) in communication with the sensor 8 and for controlling the operation of the pumps 10a, 10b based on the sensed liquid level in the well 4. FIG. 1 shows various level trigger-points along the level sensor 8 in the form of electrodes. The control panel 11 independently activates or de-activates the pumps 10a, 10b with hysteresis in response to it sensing the liquid level via the level sensor 8.

In practice, the pumping stations 2 can be located in isolated and remote locations, and are not typically manned. In the event of a failure at the pumping station 2, workers including unskilled workers often access the control panel 11 in an attempt to fix any problem and restore the pumping station 2 to operation. Serious injuries to the workers such as burns, blindness can and hearing damage can result from arc flash which, in turn, can result from the failure of control panel equipment such as starter motors, circuit breakers, loose connections etc. Workers have been known to actually bypass tripped safety devices in control panels 11 with screwdrivers with a view of returning pumps 10 to operation which is unreasonably risky. Such irresponsible behavior not only exposes the worker to the prospect of injury, but accordingly poses a personal liability threat to the owner of the pumping station 2.

Embodiments of the present invention reduce personal liability claims against the owner of the pumping station.

SUMMARY OF THE INVENTION

According to one aspect of the present invention, there is provided a method for controlling access to a compartment of a control panel, the method including the steps of posing, with a controller, an indemnification query to a user; receiving, with the controller, a response to the indemnification query; and enabling, with the controller, access to the compartment subsequent to receiving said response.

The response to the indemnification query posed to the user indemnifies the owner of the control panel against any personal liability claims for subsequent actions the user may undertake when accessing the compartment and that result in injury.

The method may further include the step of capturing an identity of the user. The identity may be related to distinctive clothing worn by the user or a face of the user. The capturing may involve verifying entered login details of the user. The capturing may involve capturing at least one photographic image of the user. The photographic image may be transmitted to a remote site for visual verification by a supervisor. The capturing may involve electronically reading an identity tag (e.g. RFID tag). The method may involve determining from the captured photographic image that the worker is not wearing appropriate safety gear.

The method may further include the step of receiving a task selection from the user. The step of posing may be performed responsive to determining that the task selection is dangerous. The method may further include the step of receiving a compartment selection relating to the identity of the compartment. The method may further include the step of displaying mandatory requirements for undertaking the task selection for the compartment selection.

The indemnification query may relate to safety equipment worn by the user.

Prior to the step of enabling, the method may include the steps of posing a supervisor indemnification query to a supervisor; and receiving a response to the supervisor indemnification query.

The method may further include the step of posing another indemnification query to another user. The method may further include the step of posing another indemnification query to the user. The access to the compartment may be enabled responsive to receiving responses.

The step of enabling may involve electronically unlocking a door of the compartment. The door may be electronically unlocked responsive to receiving input from the user.

The method may further include the step of disabling power supply to the compartment response to enabling access to the compartment.

The method may further include the step of storing an access record including access information relating to the enabled access. The access information may include the captured identity of the user, the posed queries, the responses and a date and time relating to the access.

According to another aspect of the present invention, there is provided a control panel having internal compartments, the control panel configured to pose an indemnification query to a user; receive a response to the indemnification query; and enable access to at least one of the compartments subsequent to receiving said response.

According to another aspect of the present invention, there is provided a controller for controlling access to a compartment, the controller configured to pose an indemnification query to a user; receive a response to the indemnification query; and enable access to the compartment subsequent to receiving said response.

According to another aspect of the present invention, there is provided an access control method including the steps of posing, with a controller, at least one indemnification query to at least one user; receiving, with a controller, a response to the indemnification query; and enabling, with a controller, access to at least one compartment subsequent to receiving said response.

The compartment may be a sewage well compartment.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

Figure 1:
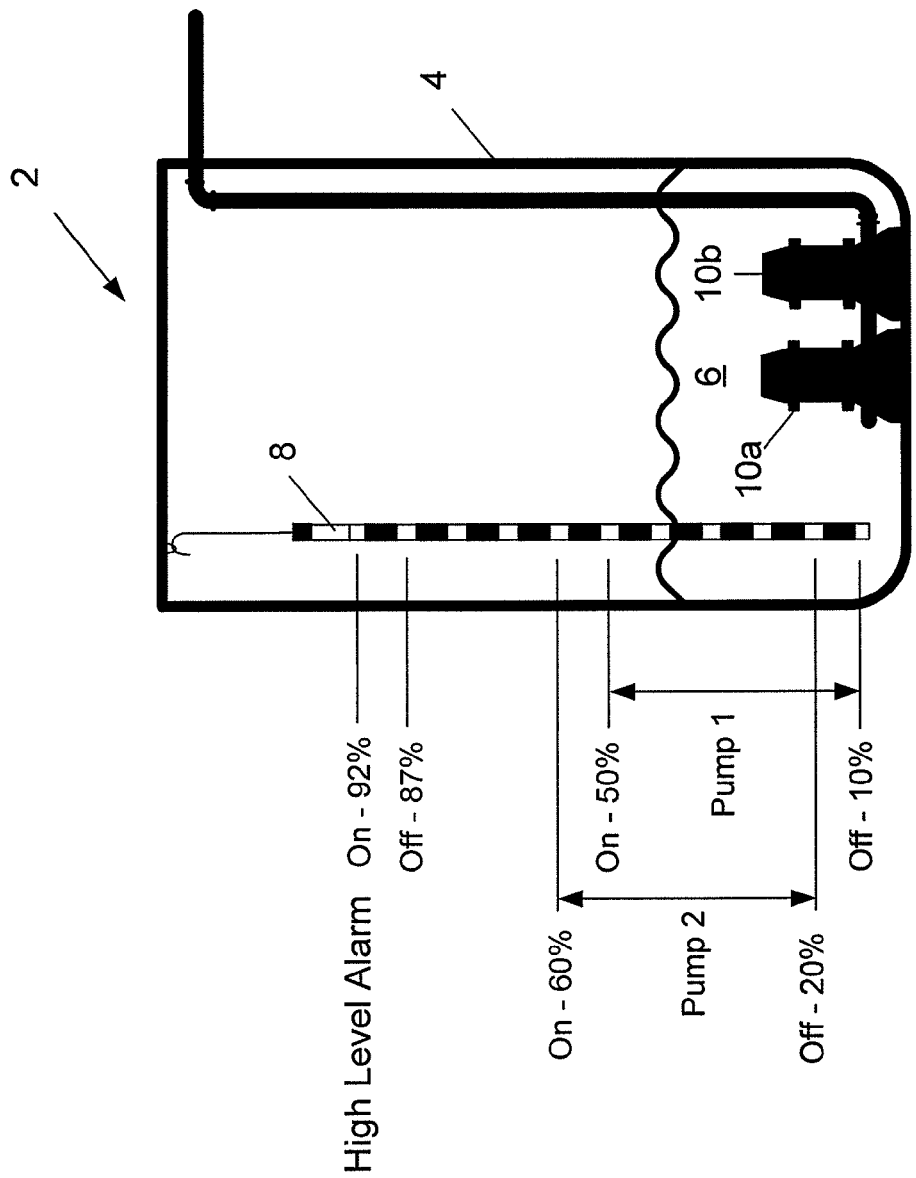
FIG. 1 is a schematic diagram of a pumping station for emptying a sewage well.
Figure 2:
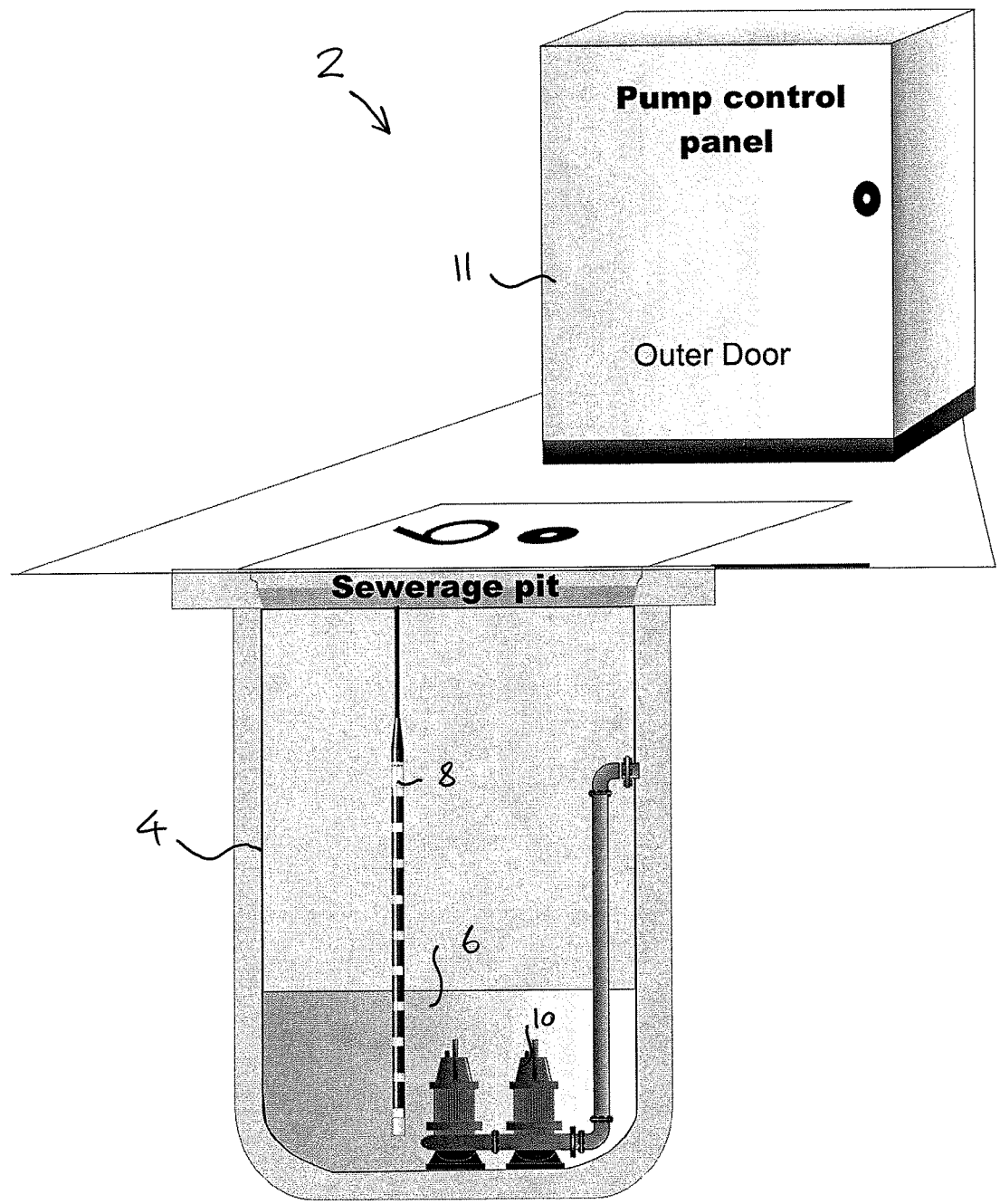
FIG. 2 is a schematic diagram of the pumping station of FIG. 1.
Figure 3:
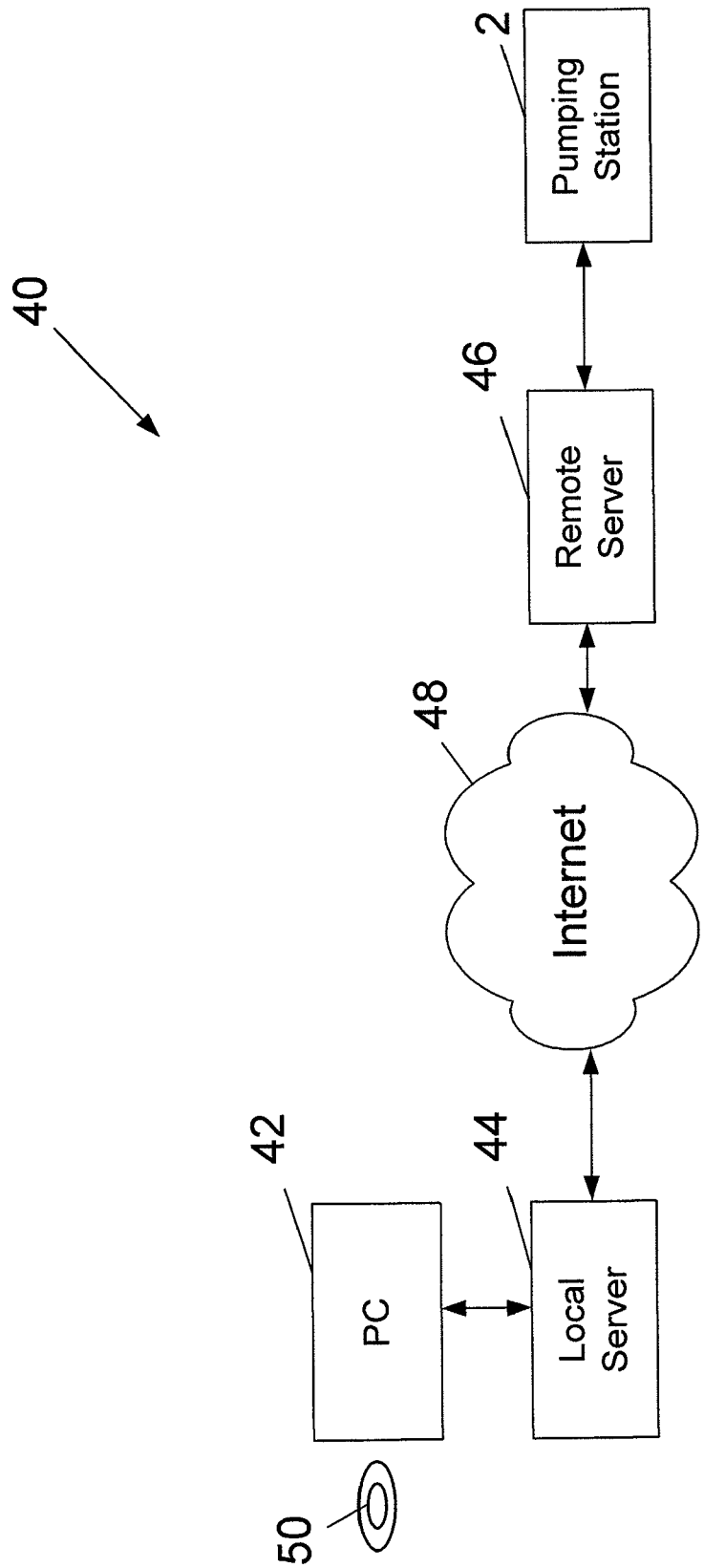
FIG. 3 is a schematic diagram of a hosted system for controlling a remote pumping station in accordance with an exemplary embodiment of the present invention.

An embodiment of the present invention will now be described with reference to a hosted supervisory control and data acquisition (SCADA) system 40 for controlling a remote pumping station 2 and shown in FIG. 3. The system 40 includes a Personal Computer (PC) 42 which is interfaced to a local server 44. In turn, the local server 44 is connected in communication with a remote server 46 via the Internet 48. The remote server 46 is located at the pumping station 2. A pumping station supervisor (not shown) can monitor workers undertaking maintenance and repair work at the remote pumping station 2 using the PC 42 without the need to travel to the pumping station 2. In this regard, a remote camera system at the pumping station can transmit images to the PC 42 for viewing by the supervisor.

Figure 4:
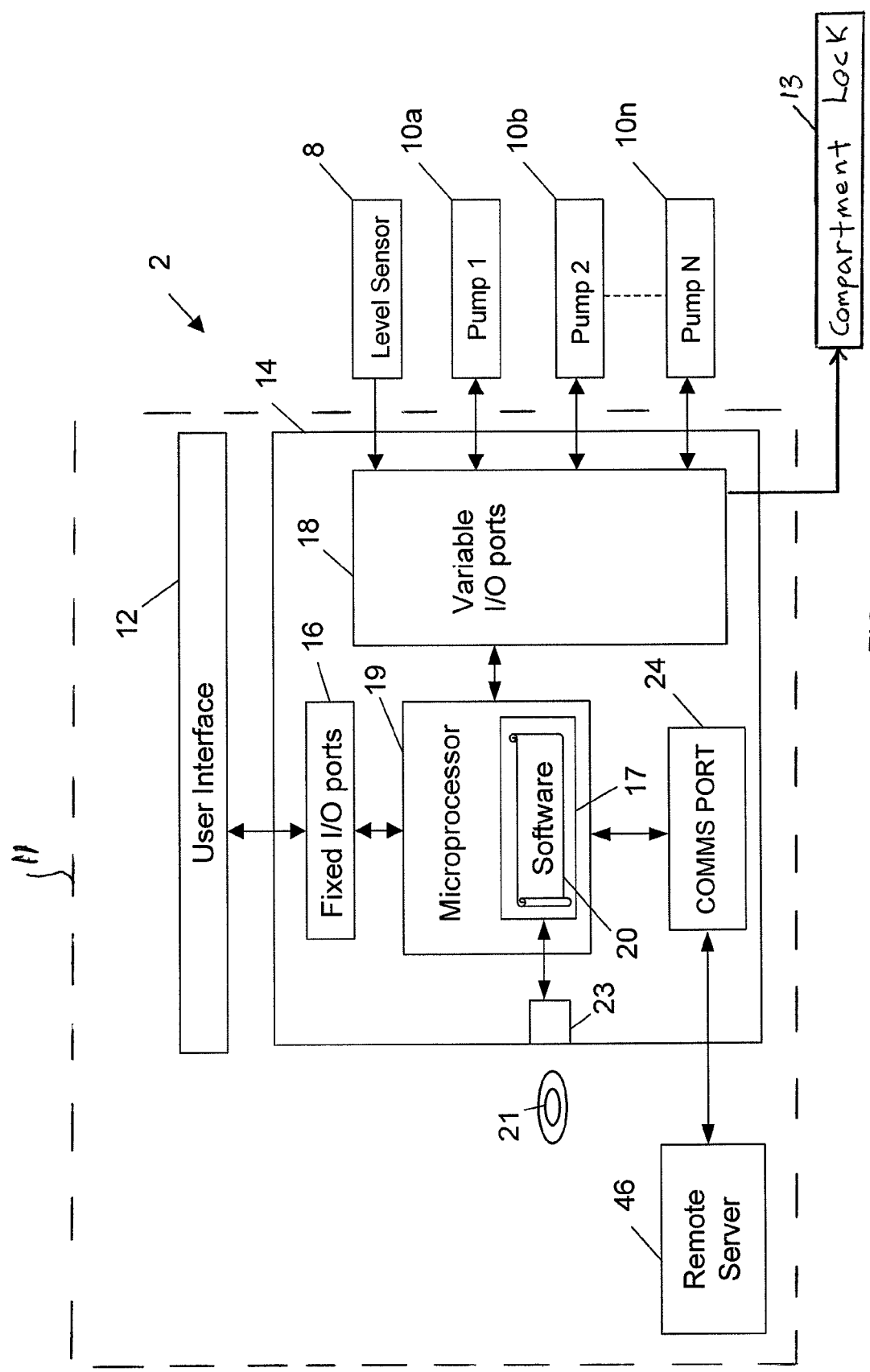
FIG. 4 is a block diagram showing a pump control panel of the pumping station shown in FIG. 3.

A pump control panel 11 of the pumping station 2 is shown in FIG. 4. As previously discussed, the pumping station 2 includes a level sensor 8 for sensing the liquid level in a well 4, and a pair of pumps 10a, 10b (e.g. variable speed drive (VFD) three-phase pumps) for pumping liquid 6 out of the well 4 as required. The pump control panel 11 houses a pump station controller 14 for controlling the operation of the pumps 10 based on the sensed liquid level in the well. A user interface 12 is provided to enable a remote user (e.g. a maintenance worker reconfiguring the pumping station 2) to input data to the controller 14 and review information on a display relating to gaining access to internal compartments of the pump control panel 11. The user interface 12 is fixedly wired to fixed input/output (I/O) ports 16 of the controller 14 which, in turn, are interfaced using suitable circuitry to a microprocessor 19 that executes a pumping station software product 20.

Figure 6:
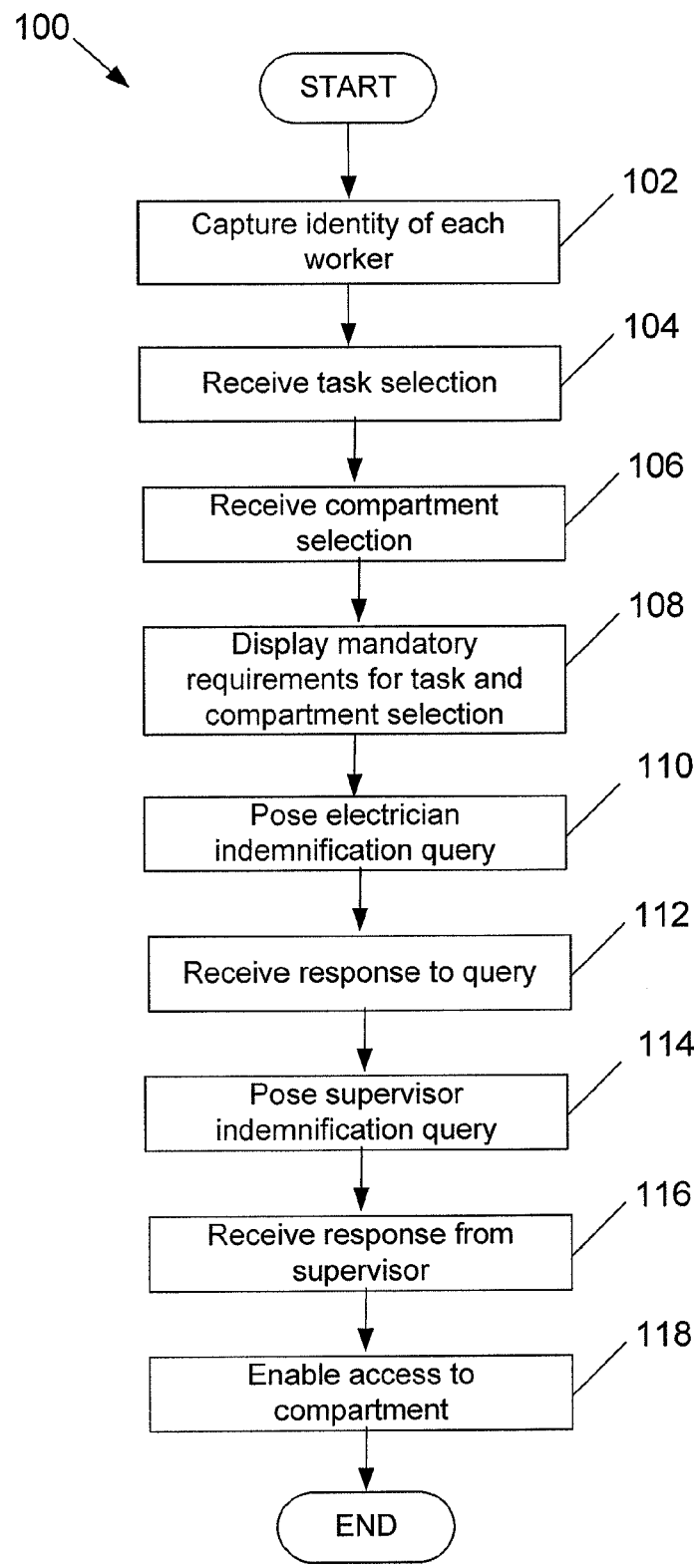
FIG. 6 is a flowchart of an access control method for controlling access to a compartment of the control panel in FIG. 5 and in accordance with an embodiment of the present invention.

The level sensor 8 and pumps 10 are wired to variable I/O ports 18 of the controller 14 which, in turn, are interfaced using suitable circuitry to the microprocessor 19. The wiring configuration between the variable I/O ports 18 and the peripheral hardware is prone to variation depending upon the type of peripheral hardware (e.g. level sensor 8, pumps 10, electronic door locks 13 of the control panel compartments etc.) used in the pumping station 2. The pumping station software product 20 includes instructions for processor 19 to perform a access control method 100 (see. FIG. 6) for controlling access to compartments of the pumping station 2. Pumping station software product 20 (including software routines) is typically provided as firmware in an integrated circuit memory device 17 or on a magnetic or optical disc 21 which microprocessor 19 can access by means of disc drive 23. The software product 20 contains computer readable instructions for execution by the processor 19.

The processor 19 is coupled in communication with a communications port 24 which, in turn, is connected to the remote server 46. The pumping station software product 20 includes routines for receiving, from the PC 42 via the Internet 48 and the servers 44, 46, commands from the supervisor. The pumping station software product 20 further includes routines for sending, to the PC 42 via the Internet 48 and the servers 44, 46, information including captured images to the supervisor.

Figure 5:
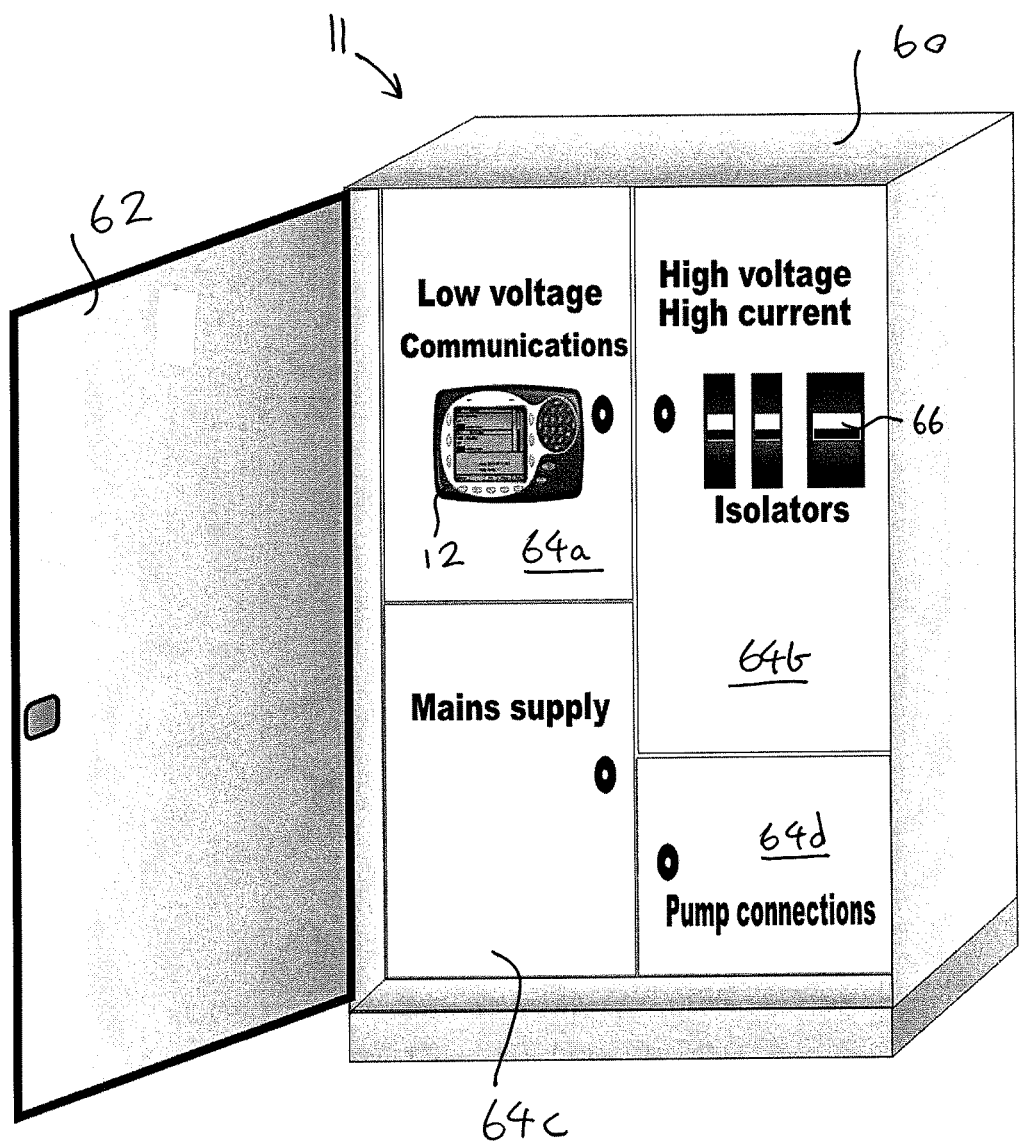
FIG. 5 is a schematic view of the pump control panel in FIG. 4 showing various internal compartments.

Turning to FIG. 5, the pump control panel 11 includes an outer cabinet 60 with a lockable door 62 that can be locked with a key to prevent internal access. The cabinet 60 contains four separate electrical equipment compartments 64a-d each with an electronically lockable door through which access can be gained. A low voltage communications compartment 64a houses low voltage electrical equipment and communications equipment including remote server 46. The controller's user interface 12 protrudes through the door of the low voltage communications compartment 64a. A high voltage/high current compartment 64b houses connections to electrical isolators 66 that protrude through its door. A mains supply compartment 64c includes a power transformer and other mains supply equipment. Finally, a pump connections compartment 64d contains wiring connector blocks for configuring the pumps 10.

According to an embodiment of the present invention, there is provided a access control method 100 for controlling access to the internal compartments 64 as described in detail below. The method 100 involves posing, with the controller 14, one or more indemnification queries to one or more workers (users) maintaining or repairing the control panel 11. The controller 14 further receives a response to the indemnification queries from the workers, and enables access to at least one compartment 64 only after receiving the response. The response to the indemnification queries posed to the workers indemnifies the owner of the control panel 11 against any personal liability claims for subsequent irresponsible actions the workers may undertake when accessing the compartment and that result in injury. The workers are made accountable for their actions and are compelled to comply with basic safety procedures such as wearing mandatory protective equipment. In some instances, it is mandatory that more than one worker be present before working with potentially dangerous equipment in the compartments 64.

The access control method 100 is described in detail below with reference to FIG. 6.

Figure 7:
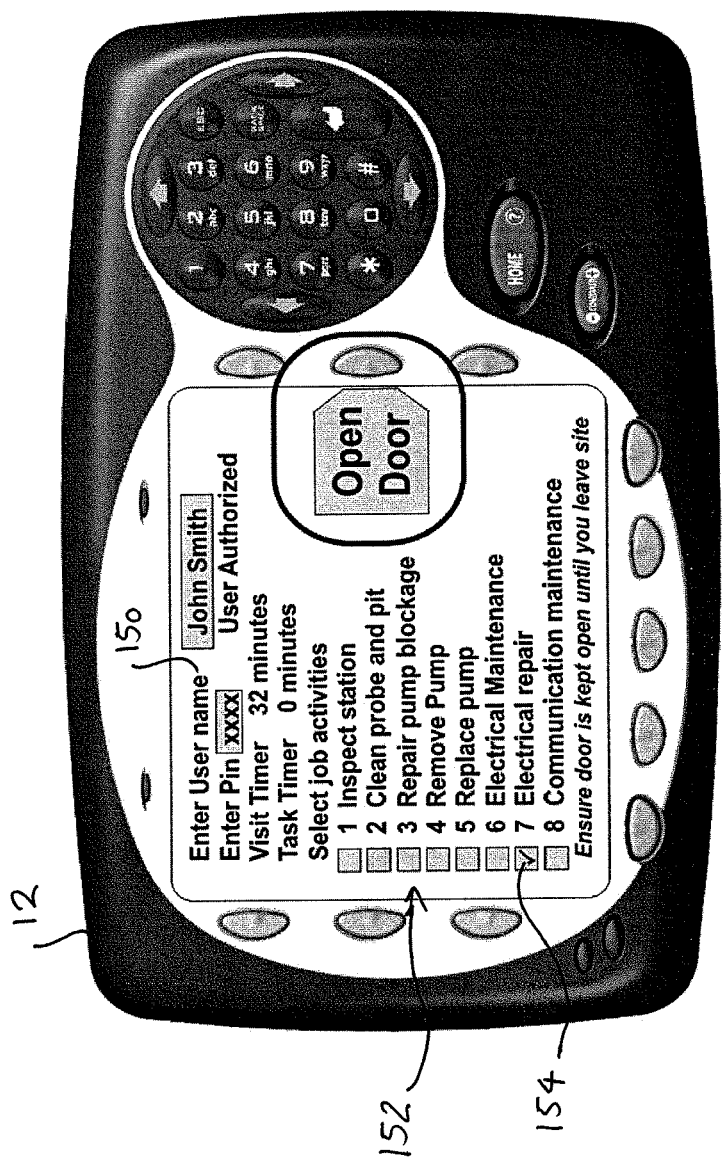
FIG. 7 is a front perspective view of a controller user interface of the control panel of FIG. 5, the user interface displaying an initial login screen.

At step 102, the controller 14 captures the identity of each worker to perform work on the control panel 11. As shown in FIG. 7, a login screen may be displayed on the user interface 12 and the capturing of the worker identity involves verifying entered login details 150 (i.e. username and password). The controller 14 in conjunction with the camera system can capture at least one photographic image of each worker which can be transmitted to the remote PC for visual verification by a supervisor.

At step 104, the controller 14 receives a task selection from the worker. As shown in FIG. 7, a list 152 of selectable possible task selections 154 is presented to the worker. In the event that the controller 14 deems the received task selection to be dangerous (e.g. an electrical repair), the method 100 proceeds to step 106.

Figure 8:
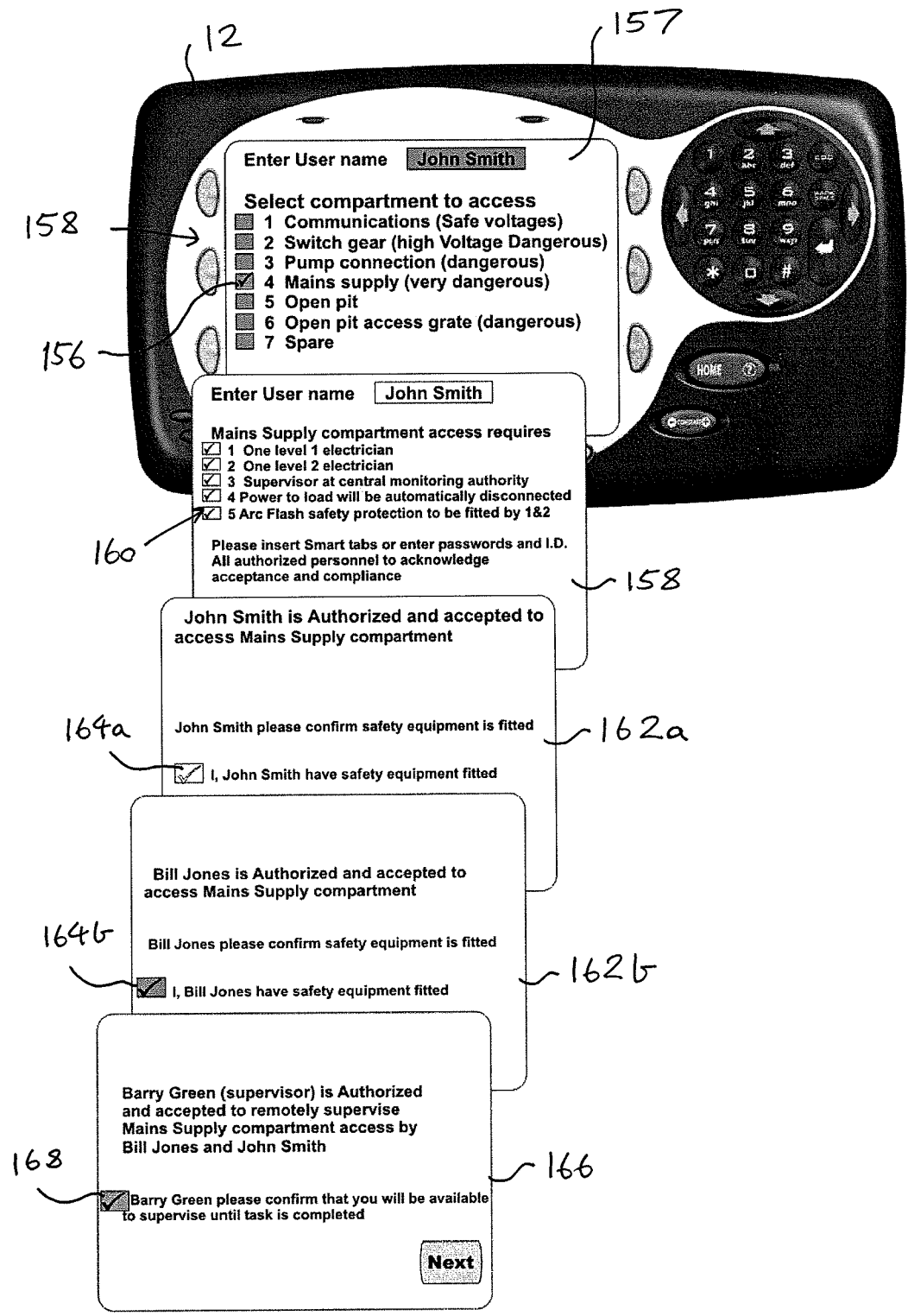
FIG. 8 shows the controller user interface of FIG. 7 displaying a series of screens when performing the access control method of FIG. 6.

At step 106, the controller 14 receives a compartment selection relating to the identity of the compartment 64 from the worker. As shown in FIG. 8, a selection screen 157 displaying a list 158 of selectable possible compartment selections 156 is presented to the worker. The compartments selections 156 relate to the control panel compartments 64a-d and can also include other compartments 64 external to the control panel 11 such as the sewage well 4.

At step 108, the controller 14 displays a requirement screen 158 including a list 160 of mandatory requirements for undertaking the task selection 154 received at step 104 with the compartment selection 156 received at step 106. In the example of FIG. 8, for the task selection 154 of an electrical repair and the compartment selection 156 of very dangerous mains supply compartment 64c, the mandatory requirements include the presence of two electricians each fitted with safety protection gear (e.g. overalls, helmet and eyewear) and the supervision of a supervisor. Once again, the controller 14 captures and verifies the identity and authority level of each electrician to perform work on the control panel 12 in a similar manner previously described in relation to step 102.

At step 110, the controller 14 poses an indemnification query 162 to each electrician in a query box. Each indemnification query 162 queries whether the electrician has appropriate safety protection gear fitted.

At step 112, the controller 14 receives a response to each indemnification query 162 when the electrician selects a confirmation checkbox 164 confirming that safety gear is fitted. By selecting the checkbox 164, the electrician is confirming that they are fitted with appropriate safety gear which indemnifies the owner of the control panel 11 against any personal liability claims for injuries that may result if the electrician removes the safety gear when accessing the dangerous mains supply compartment 64c.

At step 114, the controller 14 poses a supervisor indemnification query 166 to the supervisor using remote PC 42 in the form of a query box. The supervisor indemnification query 162 queries whether the supervisor is authorized and prepared to supervise the electricians for the selected task selection 154 and compartment selection 156.

At step 116, the controller 14 receives a response to the supervisor indemnification query 166 when the supervisor selects a confirmation checkbox 168. By selecting the checkbox 168, the supervisor is confirming that he will supervise the electricians performing the selected task selection 154 for the compartment selection 156 and in doing so indemnifies the owner of the control panel 11 against any personal liability claims for injuries that may result owing to inattention of the supervisor.

Figure 9:
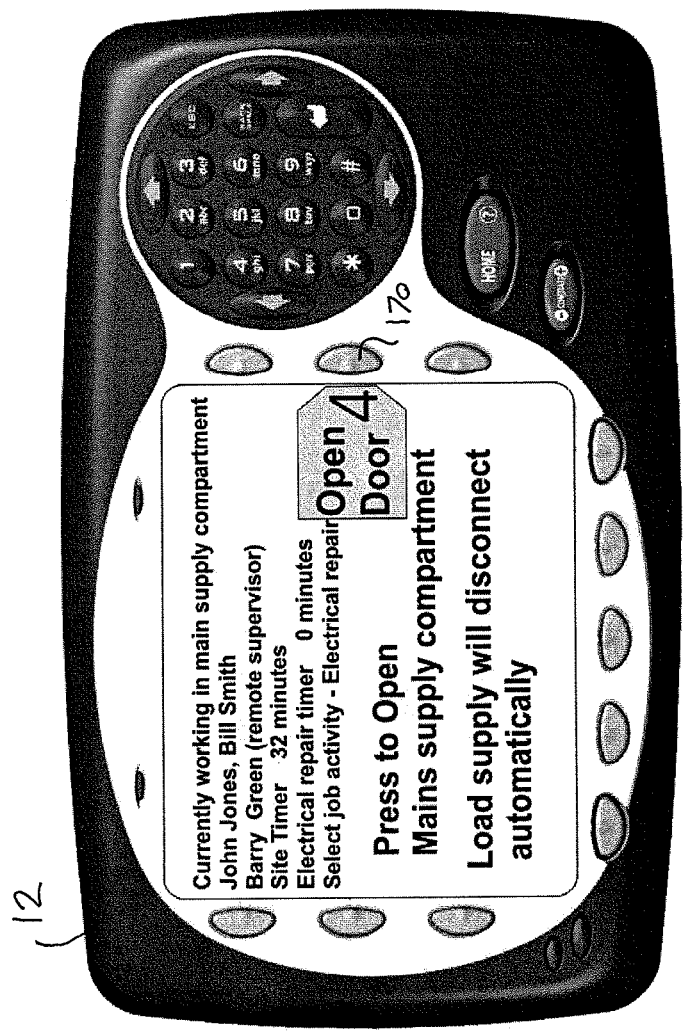
FIG. 9 shows the controller user interface of FIG. 7 displaying an unlock compartment screen.

At step 118, only after receiving the responses from each electrician and the supervisor, the controller 14 enables access to the dangerous mains supply compartment 64c so that the electricians can perform their work under the supervision of the supervisor. Access is enabled when the controller 14 electronically unlocks a door of the compartment 64c responsive to an electrician pressing a button 170 highlighted by the unlock compartment screen shown in FIG. 9.

Responsive to enabling access to the compartment 64c, the controller can disable power supply to the compartment 64c. The controller 14 can also store an access record including the captured identity of the user at steps 102 or 108, the posed queries at steps 110 or 114, the responses at steps 112 or 116 and one or more dates and times relating to the access to the compartment 64c. This access record is stored in either a storage media of the controller 14 or the remote PC 42 and can be used in the event of litigation being brought against the owner of the control panel 11.

A person skilled in the art will appreciate that many embodiments and variations can be made without departing from the ambit of the present invention.

The preferred embodiment described an example whereby electricians could perform their work under the supervision of the supervisor. In another embodiment, no supervision is required and access to the compartment is provided by the controller 14 responsive to receiving responses from one or more of the electricians.

In the preferred embodiment, each user was posed a single indemnification query. In another embodiment, each user may be further posed with another indemnification query.

In one embodiment, capturing the identity of each worker may involve electronically reading an identity tag (e.g. RFID tag) associated with the worker. Alternatively, the identity of the user may be captured by performing image processing of a captured photographic image to recognize distinctive clothing worn by the user or a face of the user. In one embodiment, the controller 14 may determine from the photographic image that the worker is not wearing appropriate safety gear and include the determination and the photographic image in the access record.

In another embodiment, a SCADA or hosted system is not necessarily required as all time stamped information in the access record, including confirmations that safety gear is fitted, is also stored at the controller 14 in the remote site and can be retrieved later using flash card.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

The invention claimed is:

1. A method for controlling access to a compartment of a control panel, the method including steps of:
    posing, with a controller, an indemnification query to a user;
    receiving, with the controller, a response to the indemnification query; and
    enabling, with the controller, access to the compartment subsequent to receiving said response.

2. The method as claimed in claim 1, further including a step of capturing an identity of the user.

3. The method as claimed in claim 2, wherein the capturing involves capturing at least one photographic image of the user.

4. The method as claimed in claim 3, wherein the photographic image is transmitted to a remote site for visual verification by a supervisor.

5. The method as claimed in claim 3, further involving determining from the captured photographic image that the user is not wearing appropriate safety gear.

6. The method as claimed in claim 2, wherein the identity relates to distinctive clothing worn by the user or a face of the user.

7. The method as claimed in claim 1, further including a step of receiving a task selection from the user.

8. The method as claimed in claim 7, wherein the step of posing is performed responsive to determining that the task selection is dangerous.

9. The method as claimed in claim 7, further including a step of receiving a compartment selection relating to an identity of the compartment.

10. The method as claimed in claim 9, further including a step of displaying mandatory requirements for undertaking the task selection for the compartment selection.

11. The method as claimed in claim 1, wherein the indemnification query relates to safety equipment worn by the user.

12. The method as claimed in claim 1 wherein, prior to the step of enabling, the method includes the steps of:
    posing a supervisor indemnification query to a supervisor; and
    receiving a response to the supervisor indemnification query.

13. The method as claimed in claim 1, further including a step of posing another indemnification query to either the user or another user.

14. The method as claimed in claim 1, wherein the step of enabling involves electronically unlocking a door of the compartment responsive to receiving input from the user.

15. The method as claimed in claim 1, further including a step of disabling power supply to the compartment in response to enabling access to the compartment.

16. The method as claimed in claim 1, further including a step of storing an access record including access information relating to the enabled access.

17. A control panel having internal compartments, the control panel configured to:
    pose an indemnification query to a user;
    receive a response to the indemnification query; and
    enable access to at least one of the compartments subsequent to receiving said response.

18. A controller for controlling access to a compartment, the controller configured to:
    pose an indemnification query to a user;
    receive a response to the indemnification query; and
    enable access to the compartment subsequent to receiving said response.

19. The controller as claimed in claim 18, wherein the compartment is a sewage well compartment.

20. An access control method including steps of:
    posing, with a controller, at least one indemnification query to at least one user;
    receiving, with the controller, a response to the indemnification query; and
    enabling, with the controller, access to at least one compartment subsequent to receiving said response.

* * * * *